United States Patent [19]
Masaki

[11] Patent Number: 5,257,192
[45] Date of Patent: Oct. 26, 1993

[54] BRAKE PRESSURE CONTROL SYSTEM FOR MOTOR VEHICLES

[75] Inventor: Shouichi Masaki, Chiryu, Japan

[73] Assignee: Nippondenso Co., Ltd., Kariya, Japan

[21] Appl. No.: 884,460

[22] Filed: May 14, 1992

Related U.S. Application Data

[63] Continuation of Ser. No. 552,121, Jul. 13, 1990, abandoned.

[30] Foreign Application Priority Data

Jul. 14, 1989 [JP] Japan ................................. 1-183504

[51] Int. Cl.$^5$ ............................................. B60T 8/50
[52] U.S. Cl. ............................... 364/426.02; 180/197; 303/95; 303/100
[58] Field of Search ............... 364/426.01, 426.02, 364/426.03; 303/95, 96, 100, 105, 103, 106, 108, 109, 110, 115; 180/197

[56] References Cited

U.S. PATENT DOCUMENTS

| | | | |
|---|---|---|---|
| 3,674,320 | 7/1972 | Howard et al. | 303/105 |
| 4,374,421 | 2/1983 | Leiber | 364/426.02 |
| 4,395,761 | 7/1983 | Sato et al. | 364/426.02 |
| 4,430,714 | 2/1984 | Matsuda et al. | 364/426.02 |
| 4,446,522 | 5/1984 | Sato et al. | 364/426.02 |
| 4,660,896 | 4/1987 | Matsuda et al. | 303/106 |
| 4,680,714 | 7/1987 | Kubo | 364/426.02 |
| 4,741,580 | 5/1988 | Matsubara et al. | 303/105 |
| 4,749,239 | 6/1988 | Onogi et al. | 303/95 |
| 4,831,532 | 5/1989 | Kondo | 364/426.02 |
| 4,859,002 | 8/1989 | Yoshino | 303/103 |
| 4,957,329 | 9/1990 | Matsuda | 303/97 |
| 4,969,696 | 11/1990 | Yogo et al. | 303/109 |
| 5,028,095 | 7/1991 | Okubo | 303/100 |

FOREIGN PATENT DOCUMENTS

| | | |
|---|---|---|
| 60-35646 | 2/1985 | Japan . |
| 61-81261 | 4/1986 | Japan . |
| 62-1666 | 1/1987 | Japan . |
| 63-106169 | 5/1988 | Japan . |
| 1-182155 | 7/1989 | Japan . |
| 1-190573 | 7/1989 | Japan . |
| 1-275250 | 11/1989 | Japan . |
| 1-282061 | 11/1989 | Japan . |

Primary Examiner—Thomas G. Black
Assistant Examiner—Collin W. Park
Attorney, Agent, or Firm—Cushman, Darby & Cushman

[57] ABSTRACT

A brake pressure control system for use as an antiskid braking control system, for example, for a motor vehicle, detects a skidding condition of a wheel of the motor vehicle based on a rotational speed of the wheel and a speed of the motor vehicle. A braking pressure applied to the wheel is increased and reduced according to control gradients, respectively, and the control gradients are continuously controlled so that the detected skidding condition will approach a target skidding condition. Times in which the braking pressure is continuously increased and reduced, respectively, are counted, and the control gradients are corrected depending on the counted times.

18 Claims, 9 Drawing Sheets

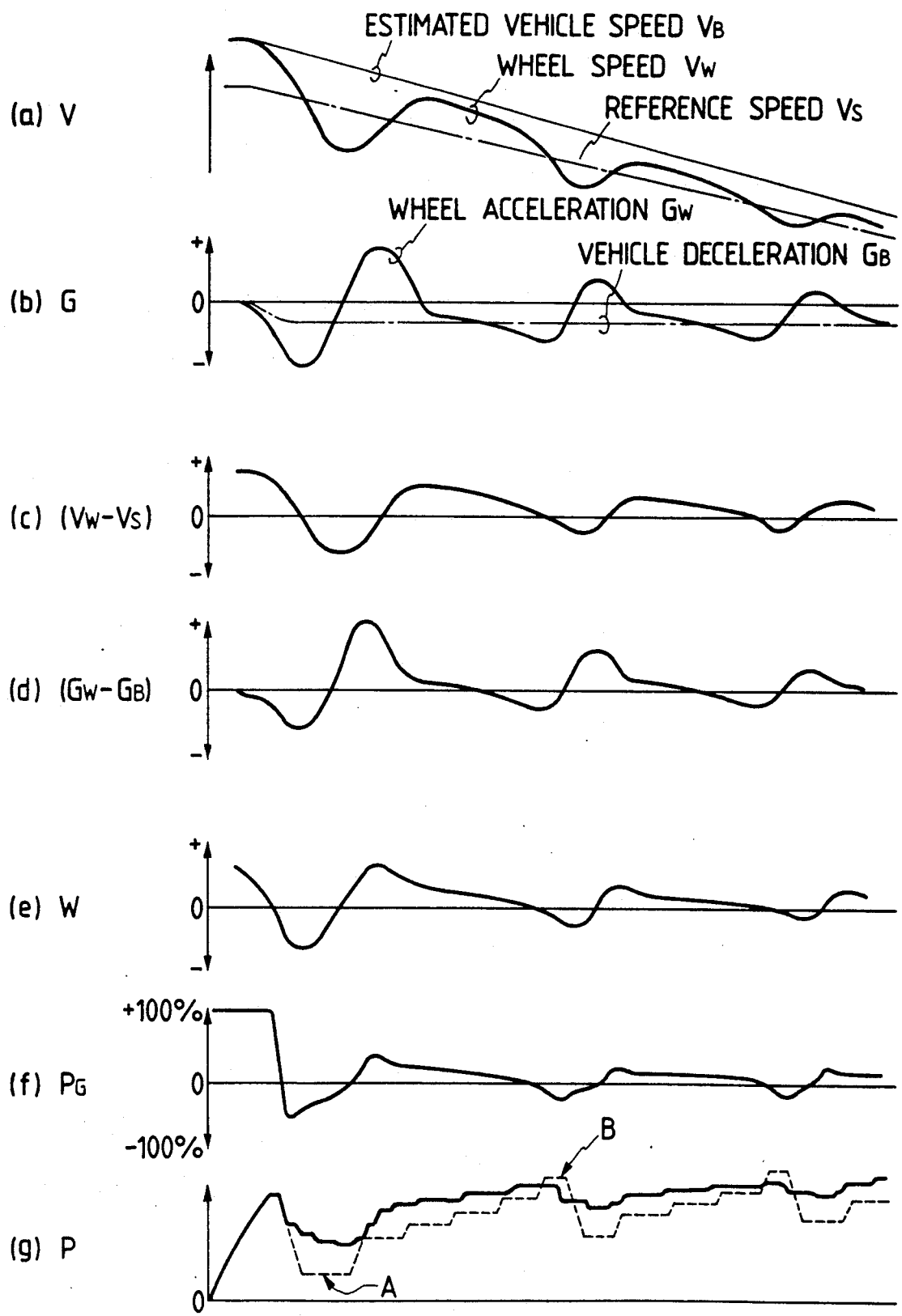

BRAKE PRESSURE CONTROL SYSTEM FOR MOTOR VEHICLES

This is a continuation of U.S. patent application Ser. No. 07/552,121, filed on Jul. 13, 1990, now abandoned.

BACKGROUND OF THE INVENTION

1. Field of the Invention

The present invention relates to a brake pressure control system such as an anti-skid braking control system or a traction control system for a motor vehicle, and more particularly to a brake pressure control system for controlling a hydraulic brake pressure based on a brake pressure control gradient which is calculated from a quantity indicative of a slipping or skidding condition of a wheel.

2. Prior Art

Japanese Patent Publication No. 59(1984)-20508, for example, discloses an anti-skid braking control system. In the disclosed anti-skid braking control system, the rotational speed and acceleration of a road wheel of a motor vehicle are detected, a plurality of reference speed or acceleration levels are calculated, and the detected rotational speed or acceleration is compared with each of the reference levels to select an actuator control mode for the control of a hydraulic brake pressure.

With the conventional anti-skid braking control system, a control gradient for the hydraulic brake pressure is not continuous while the rotational speed or acceleration of the road wheel is of continuous nature. As a result, the brake may be excessively released or applied, causing vibrations of the motor vehicle which impair the riding comfort of the passengers. The braking efficiency of the prior anti-skid braking control system still remains to be improved.

SUMMARY OF THE INVENTION

In view of the aforesaid drawbacks of the conventional anti-skid braking control system, it is an object of the present invention to provide a brake pressure control system for a motor vehicle, which can establish brake pressure control gradients substantially continuously depending on the skidding condition of the motor vehicle, so that the riding comfort and the braking efficiency are improved.

According to the present invention, there is provided, as shown in FIG. 1 of the accompanying drawings, a brake pressure control system for a motor vehicle having a plurality of wheels, comprising a plurality of wheel speed sensors for detecting rotational speeds of the wheels, respectively, a plurality of actuators for applying braking pressures to the wheels, respectively, first calculating means for calculating wheel speeds and wheel accelerations based on detected signals from the wheel speed sensors, second calculating means for calculating an estimated vehicle speed from the wheel speeds and also calculating an estimated vehicle deceleration from the estimated vehicle speed, reference speed calculating means for calculating a target reference speed from the estimated vehicle speed, deviation calculating means for calculating first deviations between the wheel speeds and the reference speed and second deviations between the wheel accelerations and the estimated vehicle deceleration, skidding condition quantity calculating means for calculating quantities indicative of skidding conditions of the wheels from a combination of the first and second deviations, pressure gradient calculating means for calculating continuous control gradients for reducing and increasing the braking pressures to be applied to the wheels by the actuators, from the quantities indicative of skidding conditions of the wheels, and actuation time ratio setting means for setting actuation time ratios of the actuators based on the calculated continuous control gradients, for thereby continuously controlling the braking pressures depending on the skidding conditions of the wheels.

According to the present invention, there is also provided a brake pressure control system for a motor vehicle having a wheel, comprising skidding condition detecting means for detecting a skidding condition of the wheel based on a rotational speed of the wheel and a speed of the motor vehicle, control means for increasing and reducing a braking pressure applied to the wheel according to control gradients, respectively, and for continuously controlling the control gradients so that the skidding condition detected by the skidding condition detecting means will approach a target skidding condition, timer means for counting times in which the braking pressure is continuously increased and reduced, respectively, by the control means, and correcting means for correcting the control gradients depending on the times counted by the timer means.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIGS. 6 through 10 are diagrams illustrative of the operation sequence of the brake pressure control system.

DETAILED DESCRIPTION

Figure 1:
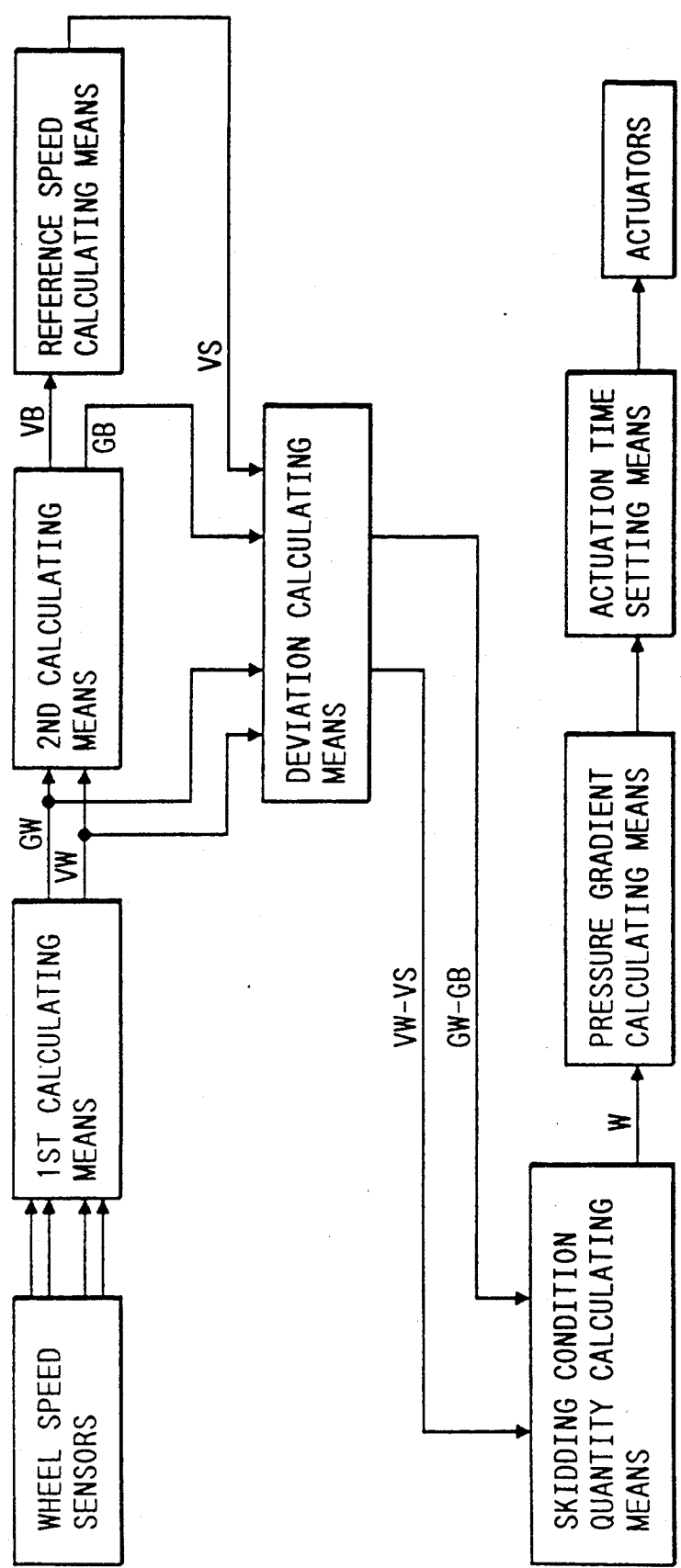
FIG. 1 is a block diagram of a brake pressure control system according to the present invention.
Figure 2:
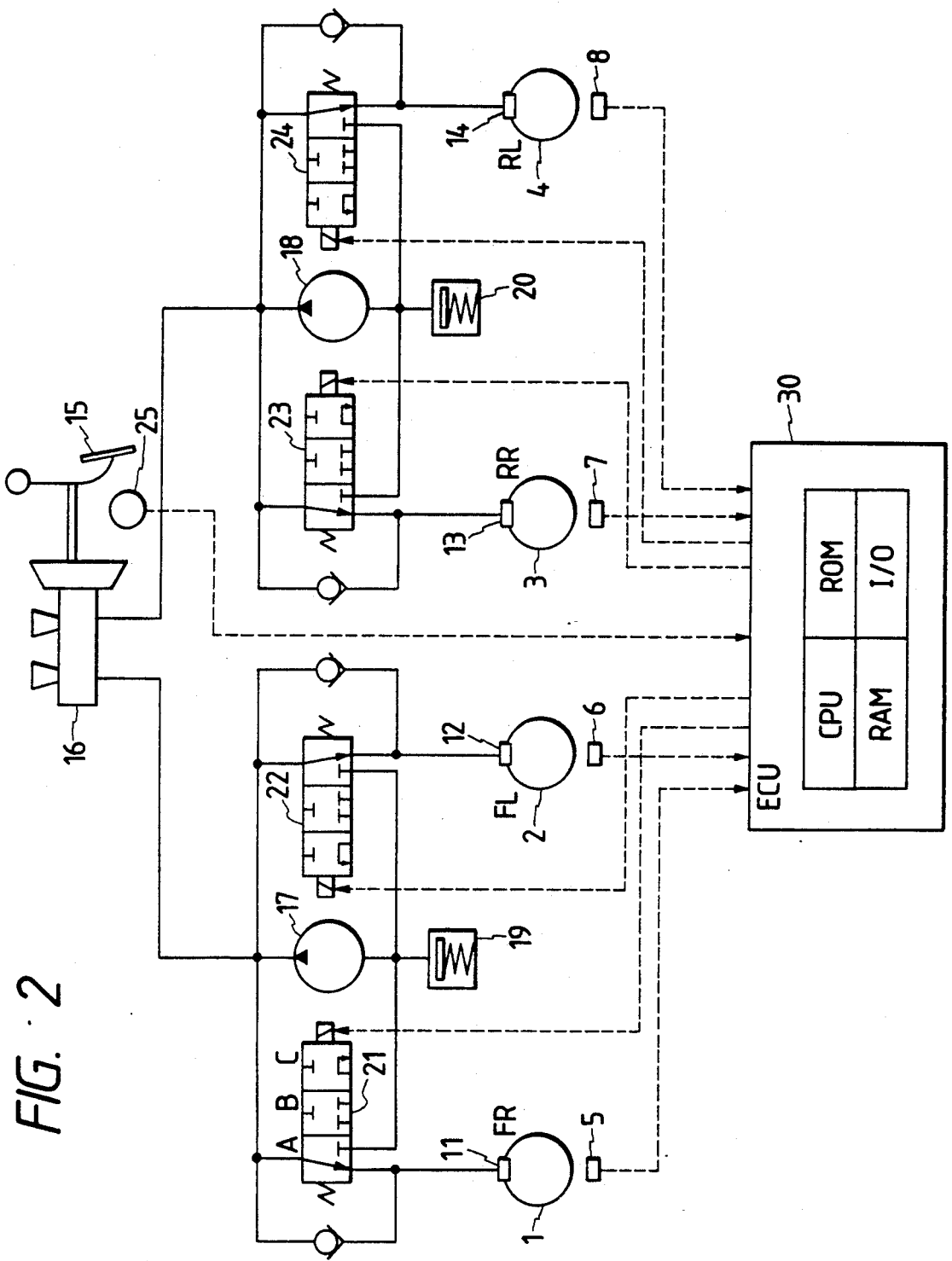
FIG. 2 is a schematic view of a hydraulic circuit of the brake pressure control system.

A brake pressure control system according to the present invention has a hydraulic circuit and an electronic control unit as shown in FIG. 2.

The brake pressure control system shown in FIG. 2 is incorporated in a four-wheeled motor vehicle of the front-engine rear-drive type.

As shown in FIG. 2, the motor vehicle has a front right wheel 1, a front left wheel 2, a rear right wheel 3, and a rear left wheel 4, which are associated respectively with wheel speed sensors 5, 6, 7, 8 each in the form of an electromagnetic pickup or a magnetoresistance element (MRE). The wheel speed sensors 5, 6, 7, 8 produce pulse signals depending on the rotational speeds of the wheels 1, 2, 3, 4, respectively.

The wheels 1, 2, 3, 4 have respective hydraulic brake devices 11, 12, 13, 14 in the form of wheel cylinders. Hydraulic pressure supplied from a master cylinder 16 which is actuated by a brake pedal 15 is transmitted through respective actuators 21, 22, 23, 24 and hydraulic pressure pipes to the hydraulic brake devices 11, 12, 13, 14, respectively. A step switch 25 detects whether the brake pedal 15 is depressed or not. When the motor vehicle is braked, i.e., when the brake pedal 15 is depressed, the step switch 25 is turned on and produces an ON signal. When the motor vehicle is not braked, i.e., when the brake pedal 15 is not depressed, the step switch 25 is turned off and produces an OFF signal.

Usually, a depression of the brake pedal 15 develops a hydraulic pressure buildup in the master cylinder 16, thereby applying braking forces to the wheels 1 through 4. The brake pressure control system also has hydraulic pressure sources for wheel skid control, which comprise hydraulic pressure pumps 17, 18 that are actuated by electric motors (not shown) to draw a brake fluid or oil from respective reservoirs 19, 20 for thereby producing a hydraulic pressure. The hydraulic pressure pump 17 and the reservoir 19 are hydraulically connected to the actuators 21, 22, and the hydraulic pressure pump 18 and the reservoir 20 are hydraulically connected to the actuators 23, 24.

The actuators 21, 22, 23, 24 are controlled by an electronic control unit (ECU) 30 to regulate hydraulic brake pressures to be applied to the respective hydraulic brake devices 11 through 14 for thereby adjusting the braking forces to be imposed on the respective wheels 1 through 4. More specifically, each of the actuators 21 through 24 comprises a solenoid-operated three-way three-position directional control valve which can be selectively shifted between a pressure increasing position, a pressure reducing position, and a pressure holding position by control signals from the ECU 30. For example, when the actuator 21 is shifted into a pressure increasing position A, it transmits oil under pressure from the master cylinder 16 to the hydraulic brake device 11, thus increasing the hydraulic brake pressure applied to the hydraulic brake device 11. When the actuator 21 is shifted into a pressure holding position B, it hydraulically disconnects the hydraulic brake device 11 from both the master cylinder 16 and the reservoir 19, thus holding the hydraulic brake pressure applied to the hydraulic brake device 11. When the actuator 21 is in a pressure reducing position C, it transmits oil under pressure from the hydraulic brake device 11 to the reservoir 19, thus reducing the hydraulic brake pressure applied to the hydraulic brake device 11. Each of the solenoid-operated three-way three-position directional control valves is shifted into the pressure increasing position; that is, each of the solenoid-operated three-way three-position directional control valves operates in a pressure increasing mode under the bias of a spring when the solenoid thereof is de-energized, and is shifted into the pressure holding mode or the pressure reducing position; that is, each of the solenoid-operated three-way three-position directional control valves operates in a pressure holding mode or a pressure reducing mode, depending on the level of a current supplied, when the solenoid thereof is energized.

When the ignition switch on the motor vehicle is turned on, the ECU 30 is energized, and receives signals from the wheel speed sensors 5 through 8 and the stop switch 25, effects arithmetic operations for anti-skid control, and generates control signals to control the actuators 21 through 24.

The ECU 30 comprises a microcomputer which has a CPU, a ROM, a RAM, and an I/0 circuit. The microcomputer of the ECU 30 is supplied with the signals from the wheel speed sensors 5 through 8, processes the signals, and produces control signals for the actuators 21 through 24.

Operation of the ECU 30 will be described below.

Figure 3:
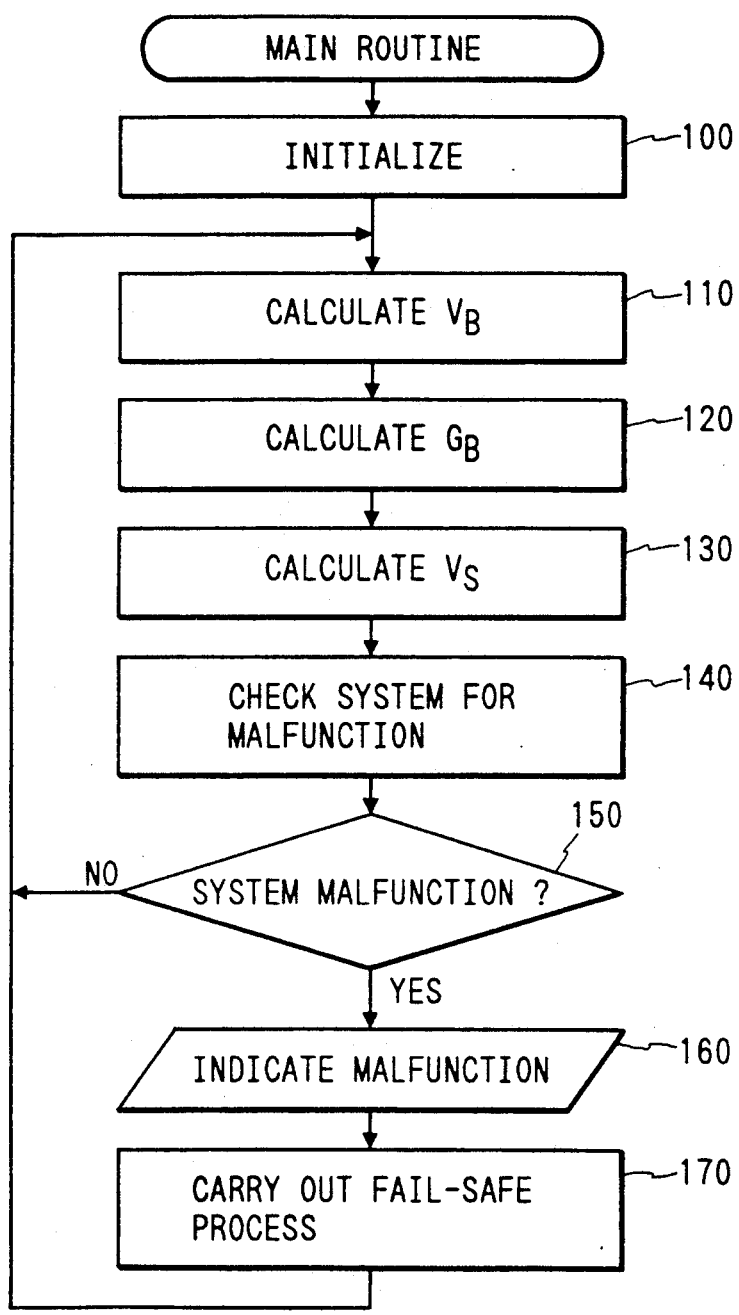
FIGS. 3 through 5 are flowcharts of an operation sequence of the brake pressure control system.

When the ignition key coupled to the ignition switch is operated on to turn on the ignition switch, the ECU 30 executes a main routine shown in FIG. 3. First, the ECU 30 is initialized in a step 100. Specifically, various variables stored in the RAM and the data in the counter are cleared, and flags are reset in the initializing step 100. After the initialization, control enters a repetitive process starting with a step 110. In the step 110, an estimated vehicle speed $V_B$ is calculated. More specifically, the estimated vehicle $V_B$ is calculated as follows: Wheel speeds $V_{W}$ (the symbol "" indicates "FR" if the wheel in question is the front right wheel 1, "FL" if the wheel in question is the front left wheel 2, "RR" if the wheel in question is the rear right wheel 3, and "RL" if the wheel in question is the rear left wheel 4) are calculated in a step 200 (FIG. 4), and the maximum one of these calculated wheel speeds is selected. Upper and lower limit vehicle speeds are produced on the basis of a preceding estimated vehicle speed calculated in the preceding estimated vehicle speed calculating cycle, respectively in view of an upper limit value of the vehicle acceleration that can take place in the actual vehicle running conditions and an upper limit value of the vehicle deceleration (negative acceleration) that can take place in the actual vehicle running conditions. One of these maximum calculated vehicle speed and upper and lower limit vehicle speeds, which has an intermediate value among these speeds, is then regarded as the estimated vehicle speed $V_B$. The estimated vehicle speed VB varies as shown in FIG. 10 at (a), for example, when the motor vehicle is braked.

In a next step 120, an estimated vehicle deceleration $G_B$ is calculated from the present estimated vehicle speed $V_{B(n)}$ calculated in the step 110, the preceding estimated vehicle speed $V_{B(n-1)}$ calculated in the preceding cycle, a time interval $\Delta T$ from the time at which the preceding estimated vehicle speed is calculated to the time at which the present estimated vehicle speed is calculated, and a predetermined LSB adjusting constant Kc, according to the following equation (1) (the suffix "n" indicates the present estimated vehicle speed and the suffix "n-1" indicates the preceding estimated vehicle speed):

$$G_B = Kc(V_{B(n)} - V_B(n-1))/\Delta T \qquad (1)$$

The estimated vehicle deceleration $G_B$ varies as shown in FIG. 10 at (b). The LSB adjusting constant Kc referred to above is used to adjust an LSB (least significant bit) which serves as a coefficient to convert hexadecimal information into a physical quantity in the CPU of the ECU 30.

In a step 130, a reference speed $V_S$ which is a target wheel speed is calculated using the estimated vehicle speed $V_B$ according to the following equation:

$$V_S = K \cdot V_B - \Delta V$$

where K and $\Delta V$ are constants. For example, K=0.95 and $\Delta V$ =2 km/h. The reference speed $V_S$ varies as indicated by the one-dot-and-dash line, for example, in FIG. 10 at (a).

A next step 140 checks the brake pressure control system for a malfunction. In the step 140, data corresponding to operating conditions of the system components when the system operates normally, which data have been stored beforehand in the ROM, are compared with data corresponding to operating conditions of the system components, which data are introduced for the malfunction check. If the result of the comparison indicates a system malfunction, then a malfunction flag indicating system malfunction is set. If no system malfunction is indicated, then the malfunction flag is reset.

A step 150 determines whether the brake pressure control system suffers a malfunction or not based on the malfunction flag. If the malfunction flag is not set, i.e., if the brake pressure control system is operating normally, then control goes back to the step 110. If the malfunction flag is set, i.e., if the brake pressure control system is malfunctioning, then control goes to steps 160, 170, and then returns to the step 110.

In the step 160, the system malfunction is indicated to the driver of the motor vehicle, so that the driver can confirm that the anti-skid control is not effective. Specifically, an indicator lamp (not shown) is indicated to announce the system malfunction.

The step 170 carries out a fail-safe process when the system malfunctions. More specifically, in the step 170, the ECU 30 produces control signals to de-energize the solenoids of the actuators 21 through 24 so that these actuators operate in only the pressure-increasing mode.

Figure 4:
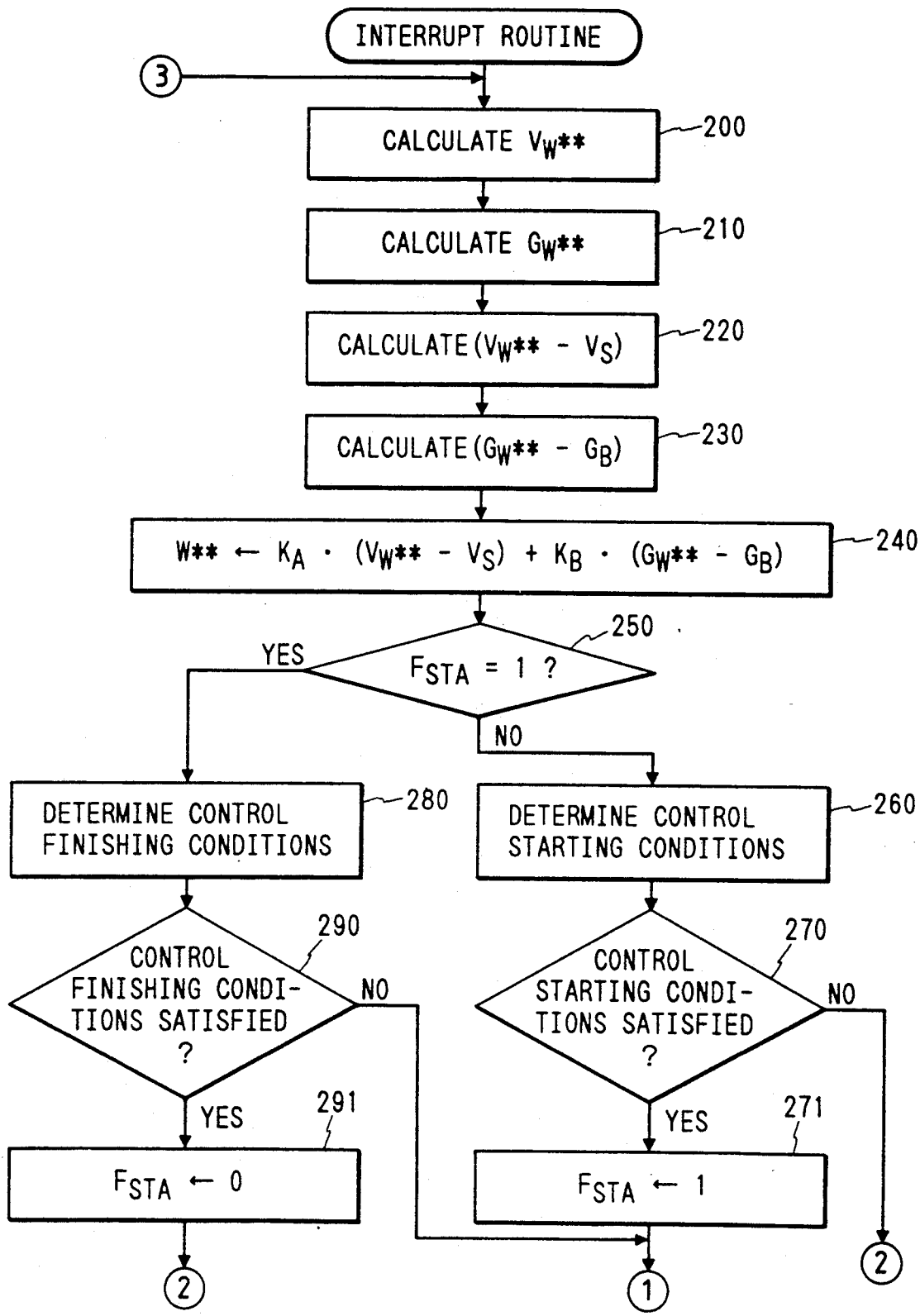
Figure 5:
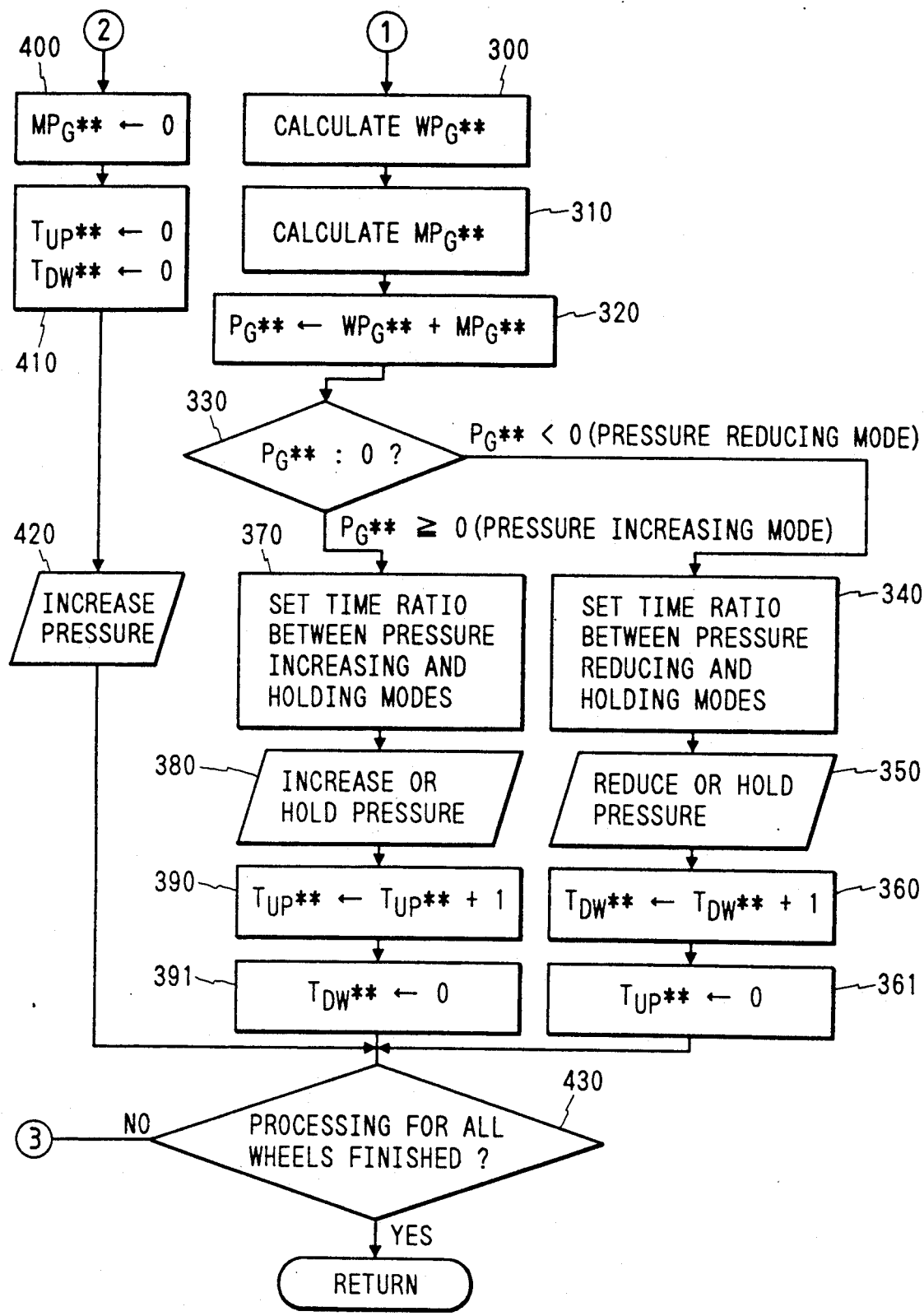

FIGS. 4 and 5 shows a flowchart of a timer interrupt routine which is executed at preset periodic intervals while the main routine shown in FIG. 3 is being executed. when the timer interrupt routine is executed, their steps are carried out successively for the four wheels, i.e., the front right (FR) wheel, the front left (FL) wheel, the rear right (RR) wheel, and the rear left (RL) wheel in the order named, and after the steps are carried out for all the four wheels, control leaves the timer interrupt routine.

First, a wheel speed $V_{W^{}}$ is calculated in a step 200 (FIG. 4). More specifically, the wheel speed $V_{W^{}}$ is obtained according to a prescribed equation using the difference between the count of vehicle speed pulses in the present cycle and the count of vehicle speed pulses in the preceding cycle and the time interval between the present and preceding cycles. If necessary, a filter process is carried out to obtain the wheel speed; that is, a filter process is carried out in which wheel speeds are produced by a plurality of successive calculations and averaged to produce a mean wheel speed as a wheel speed $V_{W^{**}}$.

Then, a wheel acceleration $G_{W^{}}$ is calculated in a step 210. More specifically, the wheel acceleration $G_{W^{}}$ is obtained according to a prescribed equation using the difference between the wheel speed calculated in the step 200 and the wheel speed of the same wheel calculated in the preceding cycle and the time interval between the calculations in the present and preceding cycles. If necessary, a filter process is carried out to obtain the wheel acceleration that is, a filter process is carried out in which wheel accelerations are calculated by a plurality of successive calculations and averaged to produce a mean wheel acceleration as a wheel acceleration $G_{W^{}}$, so that any pulsating components will be reduced in the wheel acceleration $G_{W^{}}$.

In a next step 220, the ECU 30 calculates a first deviation or difference ($V_{W^{}} - V_S$) between the wheel speed $V_{W^{}}$ calculated in the step 200 and the reference speed VS calculated in the step 130. The first deviation is of a positive value when the wheel speed is higher than the reference speed, and of a negative value when the wheel speed is lower than the reference value. When the motor vehicle is braked, the first deviation varies as shown in FIG. 10 at (c).

In a step 230, the ECU 30 calculates a second deviation or difference ($G_{W^{}} - G_B$) between the wheel acceleration $G_{W^{}}$ calculated in the step 210 and the estimated vehicle deceleration (negative acceleration) $G_B$ calculated in the step 120. The second deviation is of a positive value when the wheel acceleration is greater than the estimated vehicle deceleration (negative acceleration), and of a negative value when the wheel acceleration is smaller than the estimated vehicle deceleration. When the motor vehicle is braked, the second deviation varies as shown in FIG. 10 at (d).

In a step 240, the first deviation ($V_{W^{}} - V_S$) calculated in the step 220 and the second deviation ($G_{W^{}} - G_B$) calculated in the step 230 are multiplied by respective weighing coefficients $K_A$, $K_B$, and the products are added to produce a quantity indicative of a slipping or skidding condition $W^{**}$ of the wheel as represented by the following equation (3):

$$W^{} = K_A(V_{W^{}} - V_S) + K_B(G_{W^{**}} - G_B) \tag{3}$$

The coefficient $K_B$ also serves as a conversion coefficient for converting an acceleration into a wheel speed, and may be of a value for converting 1 G into 2 km/h, for example. The skidding condition quantity $W^{}$, which may be positive or negative, is a continuous quantity representing the skidding tendency of the wheel. If the skidding condition quantity $W^{}$ is negative and has a larger value, then the skidding coefficient of the wheel is greater, and the skidding condition quantity can be used as a demand value for increasing the gradient to reduce the hydraulic brake pressure for the corresponding wheel, thereby relieving the hydraulic brake pressure more quickly. If the skidding condition extent $W^{}$ is positive and has a larger value, then the wheel tends to restore from a skidding condition, and the skidding condition quantity can be used as a demand value for increasing the gradient to increase the hydraulic brake pressure for the wheel, thereby increasing the hydraulic brake pressure again. If the skidding condition quantity $W^{}$ is so small as to be near 0, then the wheel speed and the wheel acceleration are in the vicinity of a target skidding reference and a vehicle deceleration, respectively, and the skidding condition quantity can be used as a demand value for holding the hydraulic brake pressure substantially as it is. The skidding condition quantity $W^*$. varies as shown in FIG. 10 at (e).

A step 250 determines whether an anti-skid braking control operation is being carried out or is not started, by checking whether a control-on flag $F_{STA}$, which indicates that the anti-skid braking control operation is being effected, is 1 or 0. If the anti-skid braking control operation is not being effected ($F_{STA}=0$), control goes from the step 250 to a step 260 which checks control operation starting conditions are satisfied. For example, the step 260 checks the output signal from the stop switch 26 and the skidding condition quantity, calculated in the step 240. If the the control operation starting conditions are satisfied in a step 270, i.e., if the stop switch 26 is turned on and the skidding condition quantity is smaller than a predetermined negative value, then the control-on flag $F_{STA}$ is set to 1, and control goes to a step 300 in FIG. 5. If the control operation starting conditions are not satisfied in the step 270, then control goes to a step 400 in FIG. 5.

If the anti-skid braking control operation is being carried out ($F_{STA}=1$) in the step 250, then control goes to a step 280 for checking control operation ending conditions. For example, the step 280 checks the estimated vehicle speed $V_B$ or the output signal from the step switch 25. If the control operation ending conditions are satisfied in a step 290, i.e., if the estimated vehicle speed $V_B$ is 0 km/h, indicating that the motor vehicle is brought to a stop, or the step switch 26 is turned off, then control proceeds to a step 291 in which the control-on flag $F_{STA}$ is reset to 0, and control goes on to the step 400. If the control operation ending conditions are not satisfied, then control goes from the step 290 to the step 300.

In FIG. 5, a flow composed of steps 300 through 391 indicates a processing during the anti-skid braking control operation, and a flow composed of steps 400 through 420 indicates a processing before or after the anti-skid braking control operation.

Figure 6:
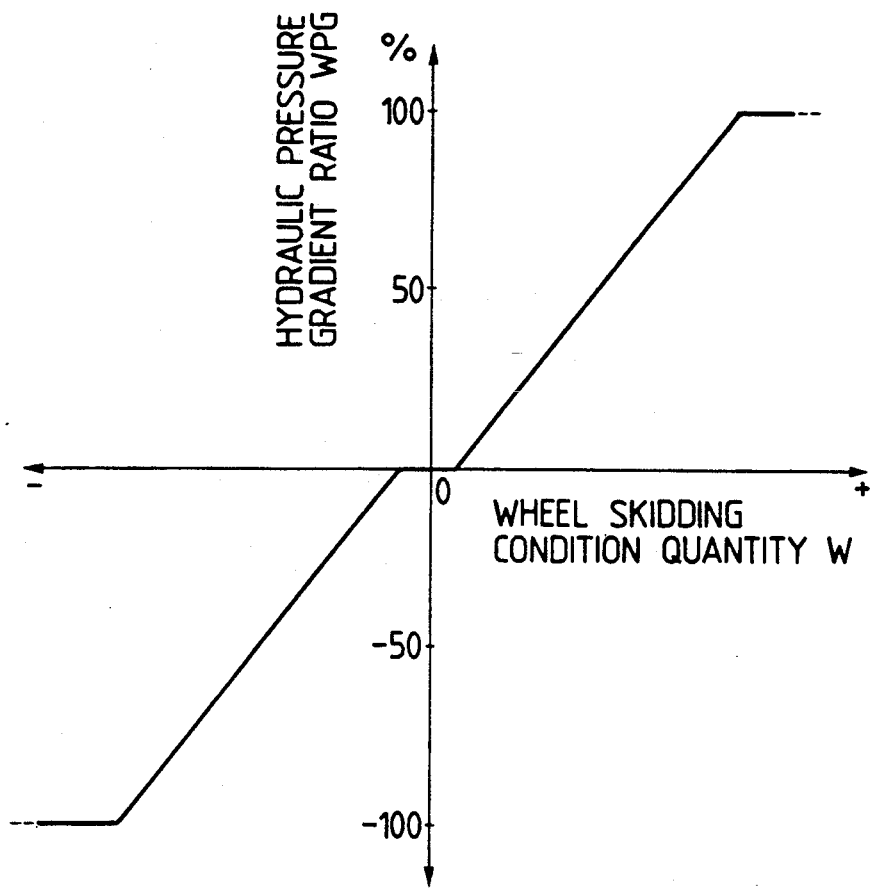

The processing during the anti-skid braking control operation will first be described below. In the step 300, the skidding condition quantity $W^{}$ is converted into a hydraulic pressure gradient ratio $WP_{G^{}}$ (which ranges from 0 to ±100%). More specifically, the skidding condition quantity $W^{}$ is converted into the hydraulic pressure gradient ratio $WP_{G^{}}$ according to the relationship shown in FIG. 6 so that the gradient for increasing the hydraulic pressure ranges from 0 to +100% and the gradient for reducing the hydraulic pressure ranges from 0 to −100%, and that a desired hydraulic pressure gradient will be established in a time-dependent combination of pressure holding and increasing patterns and a time-dependent combination of pressure holding and reducing patterns, respectively.

Figure 7:
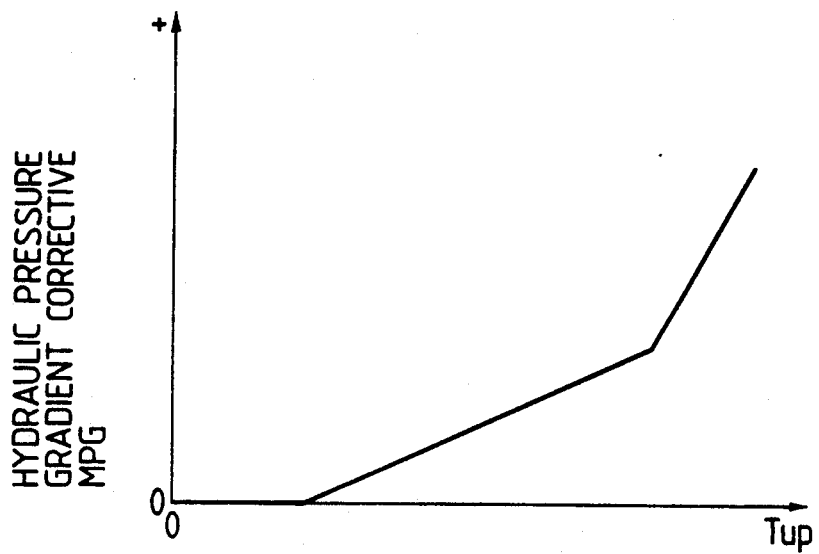
Figure 8:
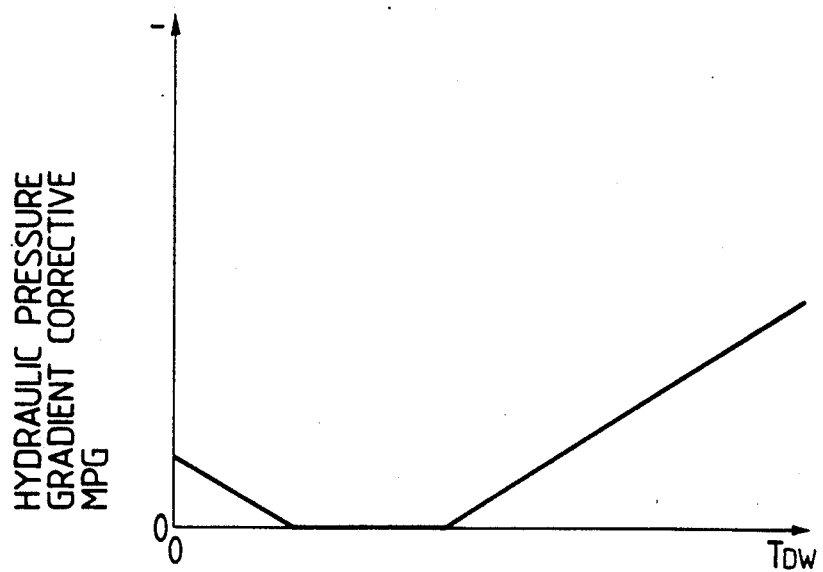

In a step 310, the ECU 30 calculates a hydraulic pressure gradient corrective $MP_{G^{**}}$ which corrects a hydraulic pressure gradient with the continuous time of the pressure increasing mode or with the continuous time of the pressure reducing mode. As shown in FIGS. 7 and 8, the hydraulic pressure gradient corrective is established such that it allows the hydraulic braking pressure to be quickly adapted to a rapid change in the road surface conditions (e.g., a wheel transition from a road surface having a low coefficient of friction to a road surface having a high coefficient of friction, or vice versa), depending on the continuous time $T_{UP}$ of the pressure increasing mode (the hydraulic pressure gradient varies from 0 to +100%) or the continuous time $T_{DW}$ of the pressure reducing mode (the hydraulic pressure gradient varies from 0 to −100%). More specifically, if the pressure increasing mode is continued but the wheels do not tend to skid even under the increased braking pressure applied for a long period of time, the corrective $MP_G$ is gradually increased with the time $T_{UP}$ as shown in FIG. 7. When the corrective $MP_G$ is thus increased, the pressure increasing gradient is increased to quickly increase the hydraulic braking pressure as upon a wheel transition from a road surface having a low coefficient of friction to a road surface having a high coefficient of friction. Immediately after the hydraulic braking pressure starts being reduced as shown in FIG. 8, i.e., immediately after the peak value of the coefficient of friction in the coefficient of friction vs. slip rate (μ-S) characteristics, a relatively large pressure reduction is effected, and thereafter if the wheels do not recover from the locked condition even when the pressure reducing mode is continued and the hydraulic braking pressure is relieved (as upon a wheel transition from a road surface having a high coefficient of friction to a road surface having a low coefficient of friction), the pressure reducing gradient is increased.

In a next step 320, the hydraulic pressure gradient ratio $WP_{G^{}}$ calculated in the step 300 and the hydraulic pressure gradient corrective $MP_{G^{}}$ are added to each other, producing a final hydraulic pressure gradient according to the following equation (4):

$$P_{G^{}} = WP_{G^{}} + MP_{G^{**}} \qquad (4)$$

The hydraulic pressure gradient $P_{G^{}}$ lies in the range from −100% to 0 to +100%. Depending on the sign, positive or negative, of the hydraulic pressure gradient $P_{G^{}}$, as determined in a step 330, the anti-skid braking control operation is effected in either the pressure increasing mode (0% ≤ $P_G$ ≤ +100%) or the pressure reducing mode (−100% ≤ $P_G$ < 0%). The hydraulic pressure gradient is then controlled according to the actuation time ratios of the actuators 21 through 24 in the pressure increase, reducing, and holding modes. The hydraulic pressure gradient $P_G$ varies as shown in FIG. 10 at (f).

More specifically, the step 330 determines whether the pressure increasing mode ($P_{G^{}} \geq 0$) or the pressure reducing mode ($P_{G^{}} < 0$) is to be effected, depending on the sign of the final hydraulic pressure gradient $P_{G^{}}$ calculated in the step 320. If the pressure reducing mode ($P_{G^{}} < 0$) is determined, then control goes to a step 340 and following steps for the execution of the pressure reducing mode. If the pressure increasing mode ($P_{G^{**}} \geq 0$) is determined, then control goes to a step 370 and following steps for the execution of the pressure increasing mode.

The processing for the pressure reducing mode which starts with the step 340 will first be described below. In the step 340, an actuation time ratio of the actuator between the pressure reducing and holding positions is found from a map stored in the ROM in the ECU 30 depending on the value of the pressure reducing gradient $P_{G^{}}$ (−100% ≤ $P_{G^{}}$ > 0%) or calculated from the value of the pressure reducing gradient $P_{G^{**}}$.

In a next step 350, the ECU 30 applies a control signals to one of the actuators 21 through 24 to operate corresponding one of the hydraulic brake devices 11 through 14 in order to control the hydraulic braking pressure applied to the corresponding wheel depending on the actuation time ratio between the pressure reducing and holding positions, which has been determined in the step 340.

In a step 360, a counter $T_{DW^{}}$ for monitoring the continuous time of the pressure reducing mode is counted up in order to correct the hydraulic pressure gradient as described with reference to the step 310. Then, a counter $T_{UP^{}}$ for monitoring the continuous time of the pressure increasing mode is cleared in a step 361. Thereafter, control goes to a step 430 which determines whether the processing for all the wheels has been finished or not. If the processing for all the wheels has not yet been finished, then control returns to the step 200 to repeat the above processing.

The processing for the pressure increasing mode which starts with the step 370 will be described below. In the step 370, an actuation time ratio of the actuator between the pressure increasing and holding positions is found from a map stored in the ROM in the ECU 30 depending on the value of the pressure increasing gradient $P_{G^{}}$ (0% ≤ $P_{G^{}}$ < +100%) or calculated from the value of the value of the pressure reducing gradient $P_{G**}$.

In a next step 380, the ECU 30 applies a control signal to one of the actuators 21 through 24 to operate the corresponding one of the hydraulic brake devices 11 through 14 in order to control the hydraulic braking pressure applied to the corresponding wheel depending on the actuation time ratio between the pressure reducing and holding positions, which has been determined in the step 370.

In a step 390, the counter $T_{UP}$ for monitoring the continuous time of the pressure increasing mode is counted up in order to correct the hydraulic pressure gradient as described with reference to the step 310. Then, the counter $T_{DW}$ for monitoring the continuous time of the pressure reducing mode is cleared in a step 391. Thereafter, control goes to the step 430 which determines whether the processing for all the wheels has been finished or not. If the processing for all the wheels has not yet been finished, then control returns to the step 200 to repeat the above processing.

Figure 9:
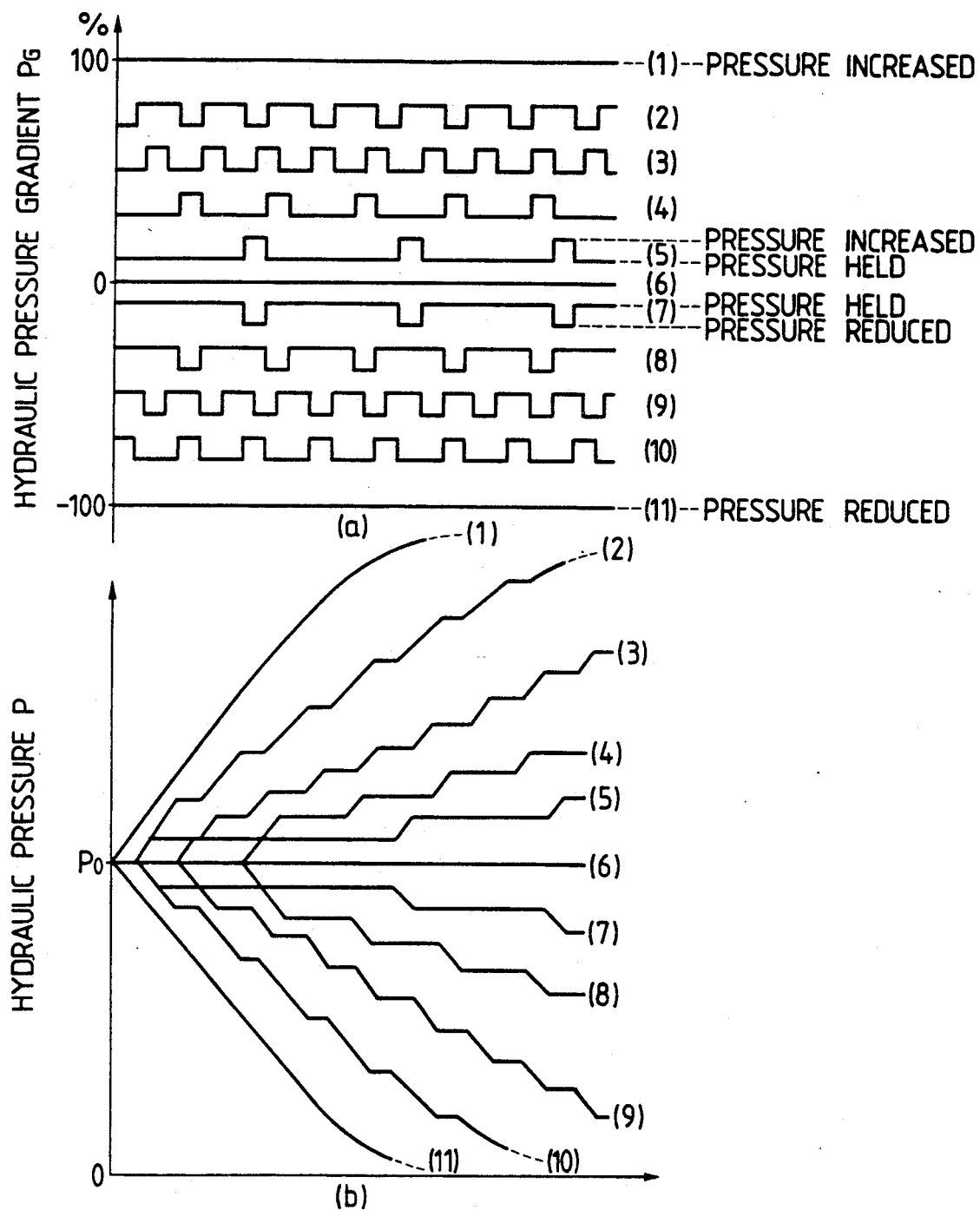

FIG. 9 shows the control of the hydraulic pressure gradient through varying the actuation time ratios of the actuators between the pressure increasing, holding, and reducing positions depending on the value of the hydraulic pressure gradient $P_G$, as described above with reference to the steps 340, 350, 370, 380.

If the value of the hydraulic pressure gradient $P_G$ is in the range from 0% to +100%, then the actuation time ratio of the actuator between the pressure increasing and holding positions is selected as shown by the waveforms (1) through (6) in FIG. 9 at (a), and the hydraulic braking pressure P is increased according to characteristic curves (1) through (6) as shown in FIG. 9 at (b).

If the value of the hydraulic pressure gradient PG is in the range from 0% to -100%, then the actuation time ratio of the actuator between the pressure increasing and holding positions is selected as shown by the waveforms (7) through (11) in FIG. 9 at (a), and the hydraulic braking pressure P is reduced according to characteristic curves (7) through (11) as shown in FIG. 9 at (b).

In this manner, the hydraulic pressure gradient or the actuation time ratios of the actuator between the hydraulic pressure control positions or modes (pressure increasing, reducing, and holding modes) are continuously varied depending on the skidding condition of the wheel and the continuous time during which the wheel skids.

The hydraulic braking pressure P in the hydraulic braking devices 11 through 14 varies as indicated by the solid line in FIG. 10 at (g) according to the present invention. The hydraulic braking pressure varies as indicated by the broken line according to the conventional brake pressure control system. As shown in FIG. 10 at (g), therefore, the brake pressure control system according to the present invention does not excessively relieve the brake pressure (excessive pressure reduction) or excessively apply the brake pressure (excessive pressure increase), which is the case with the conventional brake pressure control system as indicated by A, B. Since any variations or changes in the hydraulic braking pressure are small as a whole according to the present invention, the braking efficiency and the riding comfort are improved.

If the anti-skid braking control operation is not effected or has been finished, the hydraulic pressure gradient corrective ve $M_{PG}$ is cleared to 0 in the step 400, and the counters $T_{UP}$, $T_{DW**}$ are cleared to 0 in a step 410. Then, the ECU 30 applies control signals to the actuators to increase the braking pressure in a step 420, so that the master cylinder 16 and the hydraulic braking devices 11 through 14 are brought into communication with each other to effect an ordinary braking operation.

In the above embodiment, each of the actuators can operates selectively in the pressure increasing, holding, and reducing modes. However, each of the actuators may be arranged such that it can operate in any pressure increasing and reducing modes. In such an alternative, the hydraulic pressure gradient can continuously be varied by varying the duty ratio between the pressure increasing and reducing modes. Another actuator which can be used may operate in gradually and quickly pressure increasing modes and gradually and quickly pressure reducing modes. When the hydraulic braking pressure is to be increased, the actuator is controlled to continuously vary the hydraulic pressure gradient in a combination of the gradually and quickly pressure increasing modes and the gradually pressure reducing mode. When the hydraulic braking pressure is to be reduced, the actuator is controlled to continuously vary the hydraulic pressure gradient in a combination of the gradually and quickly reducing modes and the gradually pressure increasing mode. If an actuator having a linear pressure regulating valve which can continuously control a hydraulic pressure gradient, the produced hydraulic pressure gradient $P_G$ may directly be used to control the hydraulic braking pressure.

The present invention has been described as being applied to the anti-skid braking control system. However, the principles of the present invention are also applicable to a traction control system which applies the hydraulic braking pressure to suppress any skidding of drive wheels upon acceleration, so that the motor vehicle is stabilized on a slippery road surface and can be accelerated effectively. In such a traction control system, the skidding condition of an accelerated wheel is determined from the amount of skidding of the wheel and the acceleration of the wheel, and the hydraulic pressure gradient of an actuator can continuously be controlled depending on the determined skidding condition.

In the traction control system, the determined skidding condition of the accelerated wheel may also be used to control the opening of the throttle valve, the amount of injected fuel, and the ignition timing by smoothly varying the variables of actuators which control the throttle valve, the amount of injected fuel, and the ignition timing.

In the illustrated embodiment, the wheel skidding condition quantity is given as the sum of the amount of skidding of wheel and the acceleration of the wheel which compensates for a delay caused by the wheel skidding. However, the hydraulic pressure gradient may first be varied by only the amount of skidding of the wheel, and the acceleration may subsequently be added as a corrective.

Although a certain preferred embodiment has been shown and described, it should be understood that many changes and modifications may be made therein without departing from the scope of the appended claims.

What is claimed is:

1. A brake pressure control system for a motor vehicle having wheels, comprising:

skidding condition detecting means for detecting a skidding condition of at least one of the wheels based on at least a rotational speed of said at least one wheel and a speed of the motor vehicle in each of predetermined periodic cycles;

control means for determining a continuous pressure-changing gradient according to a difference between said skidding condition detected by said skidding condition detecting means and a target skidding condition, said pressure-changing gradient representing one of a continuous pressure-increasing gradient and a continuous pressure-reducing gradient, and for increasing and reducing a braking pressure applied to said at least one wheel according to said pressure-changing gradient representing a continuous pressure-increasing gradient and said pressure-changing gradient representing a continuous pressure-reducing gradient, respectively, so that the skidding condition detected by said skidding condition detecting means will approach said target skidding condition;

timer means for monitoring periods of time in which the braking pressure is continuously increased and reduced, respectively, by said control means, first correcting means for correcting said pressure-changing gradient representing a pressure-increasing gradient depending on said period of time, monitored by said timer means, in which the braking pressure is continuously increased; and second correcting means for correcting said pressure-changing gradient representing a pressure-reducing gradient depending on said period of time, monitored by said timer means, in which the braking pressure is continuously reduced.

2. A brake pressure control system according to claim 1, wherein said first correcting means comprises means for increasing the pressure-changing gradient representing a pressure-increasing gradient, in proportion to a period of time, monitored by said timer means, in which the braking pressure is continuously increased.

3. A brake pressure control system according to claim 1, wherein said second correcting means comprises means for increasing the pressure-changing gradient representing a pressure-reducing gradient, after the braking pressure has started being reduced by said control means.

4. A brake pressure control system according to claim 1, wherein said second correcting means comprises means for increasing the pressure-changing gradient representing a pressure-reducing gradient, in proportion to a period of time, monitored by said timer means, in which the braking pressure is continuously reduced, after said period of time has exceeded a predetermined period of time.

5. A brake pressure control system for a motor vehicle having a plurality of wheels, comprising:

a plurality of wheel speed sensors for detecting rotational speeds of the wheels, respectively;

first calculating means for calculating wheel speeds and wheel accelerations based on detected signals from said wheel speed sensors;

second calculating means for calculating an estimated vehicle speed from the wheel speeds and also calculating an estimated vehicle deceleration from said estimated vehicle speed;

reference speed calculating means for calculating a target reference speed from said estimated vehicle speed;

deviation calculating means for calculating first deviations between said wheel speeds and said reference speed and second deviations between said wheel accelerations and said estimated vehicle deceleration;

actuator means having a pressure-increasing position for increasing brake pressures applied to the wheels, a pressure-reducing position for reducing brake pressures applied to the wheels, and a pressure-holding position for holding brake pressures applied to the wheels; and control means for classifying pressure-reducing and pressure-increasing modes based on said first and second deviations calculated by said deviation calculating means, for applying a first control signal to said actuator means to actuate the actuator means with an actuation time ratio, represented by said first control signal, between said pressure-reducing position and said pressure-holding position depending on said first and second deviations in said pressure-reducing mode to control a pressure-changing gradient representing a pressure-reducing gradient of the brake pressures, and for applying a second control signal to said actuator means to actuate the actuator means with an actuation time ratio, represented by said second control signal, between said pressure-increasing position and said pressure-holding position depending on said first and second deviations in said pressure-increasing mode to control a pressure-changing gradient representing a pressure-increasing gradient of the brake pressures.

6. A brake pressure control system according to claim 5, further comprising:

timer means for monitoring periods of time in which the braking pressures are continuously increased and reduced, respectively; and correcting means for correcting said pressure-changing gradient depending on said periods of time monitored by said timer means.

7. A brake pressure control system according to claim 6, wherein said correcting means comprises means for increasing said pressure-changing gradient representing a pressure-increasing gradient, in proportion to a period of time, monitored by said timer, in which the braking pressures are continuously increased.

8. A brake pressure control system according to claim 6, wherein said correcting means comprises means for increasing said pressure-changing gradient representing a pressure-reducing gradient, after the braking pressure has started being reduced by said control means.

9. A brake pressure control system according to claim 6, wherein said correcting means comprises means for increasing a pressure-changing gradient representing a pressure-reducing gradient, in proportion to a period of time, monitored by said timer means, in which the braking pressures are continuously reduced, after said period of time has exceeded a predetermined period of time.

10. A brake pressure control system according to claim 5, wherein said control means comprises means for calculating a quantity W indicative of skidding conditions of each of the wheels according to the equation:

$$W = K_A(V_W - V_S) + K_A(G_W - G_S)$$

$K_A$, $K_S$ are constants, $V_W$ is the wheel speed, $V_S$ in the reference speed, $G_W$ is the wheel acceleration, and $G_S$ is the vehicle deceleration.

11. A brake pressure control system according to claim 10, wherein said control means comprises means for increasing said pressure-changing gradient in proportion to an absolute value of said quantity W indicative of skidding conditions of each of the wheels, means for calculating the pressure-changing gradient representing a pressure-increasing gradient for increasing the braking pressures when said quantity W is positive, and means for calculating the pressure-changing gradient representing a pressure-reducing gradient for reducing the braking pressures when said quantity W is negative.

12. A brake pressure control system according to claim 5, wherein said control means includes means for selecting said first and second actuation time ratios from a plurality of predetermined actuation time ratios.

13. A brake pressure control system according to claim 5, wherein said actuator means comprises three-position valves each having said pressure-increasing position, said pressure-reducing position, and said pressure-holding position.

14. A brake pressure control system for a motor vehicle having a wheel, comprising:
- skidding condition detecting means for detecting a skidding condition of the wheel based on at least a rotational speed of the wheel and a speed of the motor vehicle;
- calculating means for calculating a continuous pressure-reducing gradient according to the skidding condition when the skidding condition detected by said skidding condition detecting means exceeds a target slipping condition;
- pressure-reducing means for reducing a braking pressure to be applied to the wheel, according to said pressure-reducing gradient calculated by said calculating means;
- timer means for monitoring a period of time in which the braking pressure is reduced by said pressure-reducing means and
- correcting means for correcting said pressure-reducing gradient depending on said period of time monitored by said time means.

15. A brake pressure control system for a motor vehicle having a plurality of wheels, said system comprising:
- skidding condition quantity detecting means for detecting a skidding condition quantity of at least one of the wheels based on at least a rotational speed of said at least one wheel and a speed of the motor vehicle in each of predetermined periodic cycles;
- control means for generating, based on the skidding condition quantity detected by said skidding condition quantity detecting means, a first control signal to increase a pressurechanging gradient representing a pressure-reducing gradient of brake pressures applied to the wheels as the skidding condition quantity varies in a direction from a target skidding condition amount toward a wheel locked condition, and for generating a second control signal to increase a pressure-changing gradient representing a pressure-increasing gradient of brake pressures applied to the wheels as the skidding condition quantity varies in a direction from said target skidding condition amount toward a wheel unlocked condition; and
- actuator means having a pressure-increasing position for increasing the brake pressures applied to the wheels, a pressure-reducing position for reducing the brake pressures applied to the wheels, and a pressure-holding position for holding the brake pressures applied to the wheels; wherein
- said actuator means is responsive to said first control signal for actuation with a first actuation time ratio represented by said first control signal to control said pressure-changing gradient representing a pressure-reducing gradient of the brake pressures when said actuator means is between said pressure-reducing position and said pressure-holding position; and
- said actuator means is responsive to said second control signal for actuation with a second actuation time ratio represented by said second control signal to control said pressure-changing gradient representing a pressure-increasing gradient of the brake pressure when said actuator means is between said pressure-increasing position and said pressure-holding position.

16. A brake pressure control system according to claim 15, wherein said actuator means comprises three-position valves, each of said valves having said pressure-increasing position, said pressure-reducing position, and said pressure-holding position.

17. A brake pressure control system for a motor vehicle having a plurality of wheels, comprising:
- a plurality of wheel speed sensors for detecting rotational speeds of the wheels, respectively, and for generating detected signals responsive to said detected rotational speeds;
- first calculating means for calculating wheel speeds and wheel accelerations based on said detected signals from said wheel speed sensors;
- second calculating means for calculating an estimated vehicle speed from the wheel speeds and for calculating an estimated vehicle deceleration from said estimated vehicle speed;
- reference speed calculating means for calculating a target reference speed from said estimated vehicle speed;
- deviation calculating means for calculating first deviations between said wheel speeds and said reference speed and second deviations between said wheel accelerations and said estimated vehicle deceleration;
- control means for generating, based on the first and second deviations calculated by said deviation calculating means, a first control signal to increase a pressure-changing gradient representing a pressure-reducing gradient of brake pressures applied to the wheels as a wheel skidding condition corresponding to said first and second deviations means varies in a direction from a target skidding condition amount toward a wheel locked condition, and for generating a second control signal to increase a pressure-changing gradient representing a pressure-increasing gradient of brake pressures applied to the wheels as said wheel skidding condition varies in a direction from said target skidding condition amount toward a wheel unlocked condition; and
- actuator means having a pressure-increasing position for increasing the brake pressures applied to the wheels, a pressure-reducing position for reducing the brake pressures applied to the wheels, and a pressure-holding position for holding the brake pressures applied to the wheels; wherein
- said actuator means is responsive to said first control signal for actuation with a first actuation time ratio represented by said first control signal when said actuator means is between said pressure-increasing position and said pressure-holding position, thereby controlling said pressure-reducing gradient of the brake pressures, and said actuator means is responsive to said second control signal for actuation with a second actuation time ratio, represented by said second control signal when said actuator means is between said pressure-increasing position and said pressure-holding position, thereby controlling said pressure-increasing gradient of the brake pressures.

18. A brake pressure control system according to claim 17, wherein said actuator means comprises three-position valves, each of said valves having said pressure-increasing position, said pressure-reducing position, and said pressure-holding position.

* * * * *